US009296885B2

(12) United States Patent
Ellul et al.

(10) Patent No.: US 9,296,885 B2
(45) Date of Patent: *Mar. 29, 2016

(54) THERMOPLASTIC VULCANIZATES AND PROCESSES FOR MAKING THE SAME

(75) Inventors: Maria Dolores Ellul, Silver Lake Village, OH (US); Jianya Cheng, Fairlawn, OH (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 384 days.

This patent is subject to a terminal disclaimer.

(21) Appl. No.: 12/851,284

(22) Filed: Aug. 5, 2010

(65) Prior Publication Data

US 2010/0324161 A1 Dec. 23, 2010

Related U.S. Application Data

(62) Division of application No. 10/571,333, filed as application No. PCT/US2004/030517 on Sep. 17, 2004.

(60) Provisional application No. 60/503,664, filed on Sep. 17, 2003.

(51) Int. Cl.
*C08L 23/00* (2006.01)
*C08L 23/16* (2006.01)
*C08K 5/14* (2006.01)
*C08L 23/10* (2006.01)

(52) U.S. Cl.
CPC . *C08L 23/16* (2013.01); *C08K 5/14* (2013.01); *C08L 23/10* (2013.01); *C08L 2205/02* (2013.01); *C08L 2308/00* (2013.01); *C08L 2312/00* (2013.01)

(58) Field of Classification Search
CPC . C08L 23/16; C08L 2308/00; C08L 2205/02; C08L 2205/03
USPC ................... 525/210, 211, 240, 191
See application file for complete search history.

(56) References Cited

U.S. PATENT DOCUMENTS

| | | | |
|---|---|---|---|
| 2,356,128 A | 8/1944 | Thomas et al. | |
| 2,944,576 A | 7/1960 | Acosta | |
| 2,972,600 A | 2/1961 | Braidwood | |
| 3,287,440 A | 11/1966 | Giller | |
| 4,311,628 A | 1/1982 | Abdou-Sabet et al. | |
| 4,594,390 A | 6/1986 | Abdou-Sabet et al. | |
| 4,873,288 A * | 10/1989 | Komatsu et al. | 525/194 |
| 4,978,714 A | 12/1990 | Bayan et al. | |
| 4,985,502 A | 1/1991 | Izumi et al. | |
| 4,994,222 A * | 2/1991 | Iizumi et al. | 264/135 |
| 5,051,478 A | 9/1991 | Puydak et al. | |
| 5,066,700 A | 11/1991 | Braga et al. | |
| 5,100,947 A | 3/1992 | Puydak et al. | |
| 5,151,081 A | 9/1992 | Williams | |
| 5,157,081 A * | 10/1992 | Puydak et al. | 525/237 |
| 5,290,886 A | 3/1994 | Ellul | |
| 5,397,832 A | 3/1995 | Ellul | |
| 5,656,693 A * | 8/1997 | Ellul et al. | 525/171 |
| 5,847,052 A | 12/1998 | Hamanaka et al. | |
| 5,869,563 A | 2/1999 | Kawasaki et al. | |
| 5,936,038 A | 8/1999 | Coran et al. | |
| 6,150,464 A | 11/2000 | Medsker et al. | |
| 6,245,856 B1 | 6/2001 | Kaufman et al. | |
| 6,251,998 B1 | 6/2001 | Medsker et al. | |
| 6,268,438 B1 | 7/2001 | Ellul et al. | |
| 6,277,916 B1 | 8/2001 | Terbrueggen et al. | |
| 6,288,171 B2 | 9/2001 | Finerman et al. | |
| 6,395,833 B1 | 5/2002 | Tasaka et al. | |
| 6,433,090 B1 | 8/2002 | Ellul et al. | |
| 6,451,915 B1 | 9/2002 | Ellul et al. | |
| 6,462,132 B2 * | 10/2002 | Willems et al. | 525/88 |

(Continued)

FOREIGN PATENT DOCUMENTS

| | | |
|---|---|---|
| EP | 0 349 120 | 1/1990 |
| EP | 0 404 351 | 12/1990 |
| EP | 0 964 890 | 12/1999 |
| EP | 0 976 783 | 2/2000 |
| JP | 151758 | 3/1984 |
| JP | 210169 | 3/1989 |

(Continued)

OTHER PUBLICATIONS

P. Andersen, "*Mixing Practices Incorotating Twin-Screw Extruders*", Chapter 20 in Mixing and Compounding of Polymers: Theory and Practice, 1994, pp. 679-705.

(Continued)

*Primary Examiner* — Irina Krylova
(74) *Attorney, Agent, or Firm* — Stephen A. Baehl

(57) ABSTRACT

A process for producing thermoplastic vulcanizates, the process comprising (i) dynamically vulcanizing a rubber with a curative in a first stage, where the rubber is within a blend that includes the rubber, a thermoplastic resin, and the curative, where said step of dynamically vulcanizing occurs at a temperature at or above the melting point of the thermoplastic resin, where said step of dynamically vulcanizing employs a peroxide curative, and where said rubber includes polymeric units deriving from 5-vinyl-2-norbornene, (ii) continuing said step of dynamically vulcanizing to cause phase inversion of the blend to thereby convert the thermoplastic resin into a continuous phase, (iii) maintaining the blend at or above the melting point of the thermoplastic resin after the phase inversion, and (iv) introducing molten thermoplastic resin into the blend in a second stage, where said step of introducing molten thermoplastic resin occurs after phase inversion but before the blend is cooled to a temperature below the melting point of the thermoplastic resin.

16 Claims, No Drawings

(56) References Cited

U.S. PATENT DOCUMENTS

| | | | |
|---|---|---|---|
| 6,476,132 B1* | 11/2002 | Abdou-Sabet et al. | 525/100 |
| 6,610,786 B1* | 8/2003 | Itoh et al. | 525/191 |
| 6,713,520 B2* | 3/2004 | Sahnoune et al. | 521/53 |
| 7,135,533 B2 | 11/2006 | Ravishankar | |
| 7,868,096 B2* | 1/2011 | Ellul et al. | 525/240 |
| 2003/0144415 A1* | 7/2003 | Wang et al. | 524/849 |
| 2004/0171758 A1 | 9/2004 | Ellul et al. | |

FOREIGN PATENT DOCUMENTS

| | | |
|---|---|---|
| WO | WO 98/38226 | 9/1998 |
| WO | WO 03/059963 | 7/2003 |
| WO | WO 2004/000900 | 12/2003 |
| WO | WO 2005/028555 | 3/2005 |

OTHER PUBLICATIONS

T. Sakai, "*Intermeshing Twin-Screw Extruders*", Chapter 20 in Mixing and Compounding of Polymers: Theory and Practice, 1994, pp. 707-733.

M. Ellul et al., "*Chemical Surface Treatments of Natural Rubber and EPDM Thermoplastic Elastomers: Effects on Friction and Adhesion*", Rubber Chemistry and Technology, 1994, vol. 67, No. 4, pp. 582-601.

M. Ellul, et al. "*New Highly-Crosslinked TPEs based on VNB-EPDM*", American Chemical Society, Fall Meeting, Aug. 23-27, 1998, Boston, MA, PMSE Symposium, vol. 79, p. 90.

M. Xanthos, "*Process Analysis from Reaction Fundamentals*", Reactive Extrustion: Principles and Practice, ed. M. Xanthos, 1992, Research Report dated Aug. 30, 2002.

M. Ellul et al., "*Crosslink Densities and Phase Morphologies in Dynamically Vulcanized TPEs*", Rubber Chemistry and Technology, 1995, vol. 68, pp. 573-584.

J. T. Byers, Chap. 3, "Part I, Carbon Black," Rubber Technology Third Edition, Maurice Morton Ed., Chapman & Hall, London, 1995, pp. 59-60. (ISBN 0-412-53950-0).

M. P. Wagner, Chap 3, "Part II, Nonblack Fillers," Rubber Technology Third Edition, Maurice Morton Ed., Chapman & Hall, London, 1995, pp. 86-88. (ISBN 0-412-53950-0).

\* cited by examiner

THERMOPLASTIC VULCANIZATES AND PROCESSES FOR MAKING THE SAME

PRIORITY CLAIM

This application is a divisional of and claims priority to U.S. patent application Ser. No. 10/571,333, filed Mar. 7, 2006, which is a 371 National Stage Application of International Application No. PCT/US2004/30517, filed Sep. 17, 2004, which claims the benefit of Provisional Application No. 60/503,664, filed Sep. 17, 2003, the disclosures of all of which are herein incorporated by reference in their entireties.

This application claims the benefit of U.S. Provisional Application No. 60/503,664, filed on Sep. 17, 2003.

FIELD OF THE INVENTION

This invention is directed toward improved thermoplastic vulcanizates and processes for making the same.

BACKGROUND OF THE INVENTION

Thermoplastic elastomers are known. They have many of the properties of thermoset elastomers, yet they are processable as thermoplastics. One type of thermoplastic elastomer is a thermoplastic vulcanizate, which may be characterized by finely-divided rubber particles dispersed within a plastic. These rubber particles are crosslinked to promote elasticity. Thermoplastic vulcanizates are typically prepared by dynamically vulcanizing a rubber contained in a blend that includes the rubber and a thermoplastic resin.

Some thermoplastic vulcanizates are commercially produced by dynamically curing the rubber with a peroxide curative. While this curing process has the potential to produce technological useful thermoplastic vulcanizates, the use of peroxide curatives can be problematic. In particular, peroxide curatives can degrade the thermoplastic resin, which results in the reduction of mechanical properties.

This problem is further aggravated where harder thermoplastic vulcanizates are desired. As is known in the art, thermoplastic vulcanizates may be advantageously produced in a variety of hardnesses. The hardness can be adjusted by the level of thermoplastic resin that is included in the blend. Unfortunately, as the amount of thermoplastic resin is increased, the amount of peroxide curative per part of rubber that is required to effect dynamic vulcanization must also be increased even though the proportionate amount of rubber is decreased. As the amount of peroxide curative is increased, the degree of thermoplastic resin degradation is likewise increased.

Attempts have been made to overcome the problem. For example, U.S. Pat. No. 4,985,502 teaches the use of less peroxide curative. Unfortunately, the use of less curative typically hinders the ability to fully cure the rubber, which results in a sacrifice in engineering properties. Also, U.S. Pat. No. 5,656,693 attempts to alleviate the problem of thermoplastic resin degradation by employing a rubber terpolymer (e.g., ethylene-α-olefin-diene terpolymer, which may be referred to as an EADM rubber) that includes vinyl norbornene polymeric units. These rubbers are move efficiently curable with peroxides and therefore the amount of peroxide required to achieve full cure is reduced; this results in reduced impact on the thermoplastic resin.

Other attempts to alleviate problems caused by the use of peroxide curatives include the use of highly crystalline EADMs. As is generally known in the art, EADM rubbers that include a high percentage of ethylene (i.e., greater than 75 or 80 mole percent) are characterized by ethylene crystallinity. These EADM rubbers are readily curable by peroxide curatives. As a result, their use in the manufacture of thermoplastic vulcanizates have potential benefit inasmuch as less peroxide may be needed to cure the rubber.

The use of these crystalline EADM rubber, however, limits the breadth of the thermoplastic vulcanizates that can be produced. For example, the amount of oil added to thermoplastic vulcanizates is deleteriously limited. As those skilled in the art appreciate, the addition of more than 50-70 parts by weight oil to thermoplastic vulcanizates prepared from highly crystalline EADMs is extremely problematic. These thermoplastic vulcanizates that employ crystalline EADMs in larger amounts of oil will tend to exhibit exudation and stickiness of parts fabricated therefrom. U.S. Pat. No. 6,610,786 sets forth numerous examples that employ highly crystalline EADMs in the manufacture of thermoplastic vulcanizates that have little or no oil. This problem apparently exists despite the fact that this patent produces thermoplastic vulcanizates by a process where additional rubber or thermoplastic resin is added after dynamic vulcanization; the second-step addition of the thermoplastic resin may occur within the same extruder used to dynamically vulcanize the original product or within a second extruder.

Other multiple-stage processes for the production of thermoplastic vulcanizates are likewise known as disclosed in U.S. Pat. No. 6,288,171. Thermoplastic vulcanizates have been produced by "let down" processes whereby soft (e.g., Shore A of about 50) thermoplastic vulcanizates are produced and pelletized. After pelletization, the pellets are blended with polypropylene pellets and the blend is melt mixed and extruded. This process suffers from processing inefficiencies and is believed to impact performance properties of the thermoplastic vulcanizates. In another example, solid polypropylene is added in a down stream barrel during extruder production of the thermoplastic vulcanizate by using a crammer feeder. But, the solid polypropylene is not readily miscible with the molten thermoplastic vulcanizate in the time scale of this process and therefore processing and performance shortcomings are encountered.

Because thermoplastic vulcanizates are technologically important compositions, there is a continued need to develop improved thermoplastic vulcanizates that have an overall balance of improved properties. And, because peroxide-cured thermoplastic vulcanizates have potential to contribute to this technology, there remains a need to improve peroxide-cured thermoplastic vulcanizates and processes for making the same.

SUMMARY OF THE INVENTION

In general the present invention provides a process for producing thermoplastic vulcanizates, the process comprising (i) dynamically vulcanizing a rubber with a curative in a first stage, where the rubber is within a blend that includes the rubber, a thermoplastic resin, and the curative, where said step of dynamically vulcanizing occurs at a temperature at or above the melting point of the thermoplastic resin, where said step of dynamically vulcanizing employs a peroxide curative, and where said rubber includes polymeric units deriving from 5-vinyl-2-norbornene, (ii) continuing said step of dynamically vulcanizing to cause phase inversion of the blend to thereby convert the thermoplastic resin into a continuous phase, (iii) maintaining the blend at or above the melting point of the thermoplastic resin after the phase inversion, and (iv) introducing molten thermoplastic resin into the blend in a second stage, where said step of introducing molten thermoplastic resin occurs after phase inversion but before the blend is cooled to a temperature below the melting point of the thermoplastic resin.

The present invention also provides a process for preparing a thermoplastic vulcanizate, the process comprising (i) preparing a blend in a first stage comprising a rubber, a thermoplastic resin, and a curative, where the weight ratio of the thermoplastic resin to the rubber is from 0.1:1 to 2:1, where said rubber includes polymeric units deriving from 5-vinyl-2-norbornene, (ii) dynamically vulcanizing the rubber at a temperature above the melting temperature of the thermoplastic resin, where said step of dynamically vulcanizing employs a peroxide curative, and (iii) adding additional thermoplastic resin to the blend in a second stage, where said step of adding additional thermoplastic resin occurs after said step of dynamically vulcanizing causes phase inversion of the blend, and where said step of adding additional thermoplastic resin occurs before the blend is permitted to cool below the melting temperature of the thermoplastic resin.

DETAILED DESCRIPTION OF ILLUSTRATIVE EMBODIMENTS

The use of elastomeric copolymers including units deriving from vinyl norbornene in combination with a multiple-stage manufacturing process has produced peroxide-cured thermoplastic vulcanizates with an unexpectedly superior overall balance of properties. The multiple-stage process includes a first step whereby the rubber is dynamically vulcanized within a blend that includes the rubber and a thermoplastic resin; and a second step whereby additional molten thermoplastic resin is added to the product of the first step. The product of the first step, which is in its melt phase, remains in that phase between the first and second stages.

The blend that is dynamically vulcanized in the first stage preferably includes a greater volume fraction of rubber than thermoplastic resin. As a result, the thermoplastic resin is present as a discontinuous phase. As dynamic vulcanization proceeds, the viscosity of the rubber increases and phase inversion occurs. In other words, the thermoplastic resin phase becomes continuous. In one embodiment, the rubber becomes a discontinuous phase. In another embodiment, a co-continuous morphology is achieved where both the rubber and the thermoplastic resin are continuous phases. Once phase inversion is achieved and the rubber is at least partially cured (i.e., the thermoplastic resin becomes a continuous phase), the first stage ends.

Dynamic vulcanization refers to a vulcanization or curing process for a rubber contained in a blend that includes the rubber and at least one thermoplastic resin. The rubber is vulcanized under conditions of shear and extension at a temperature at or above the melting point of the thermoplastic resin. The rubber is thus simultaneously crosslinked and dispersed as fine particles within the thermoplastic resin matrix, although other morphologies, such as co-continuous morphologies, may exist depending on the degree of cure, the rubber to plastic ratio, the intensity of mixing, the residence time, and the temperature.

In one embodiment, the rubber is advantageously completely or fully cured. The degree of cure can be measured by determining the amount of rubber that is extractable from the thermoplastic vulcanizate by using cyclohexane or boiling xylene as an extractant. These methods are disclosed in U.S. Pat. No. 4,311,628. Preferably, the rubber has a degree of cure where less than 15 weight percent, more preferably less than 10 weight percent, even more preferably less than 5 weight percent, and still more preferably less than 3 weight percent of the rubber is extractable by cyclohexane at 23° C. as described in U.S. Pat. Nos. 5,100,947 and 5,151,081, which are incorporated herein by reference. Alternatively, the rubber has a degree of cure such that the crosslink density is preferably at least $4\times10^{-5}$, more preferably at least $7\times10^{-5}$, and still more preferably at least $10\times10^{-5}$ moles per milliliter of rubber. See also "Crosslink Densities and Phase Morphologies in Dynamically Vulcanized TPEs," by Ellul et al., RUBBER CHEMISTRY AND TECHNOLOGY, Vol. 68, pp. 573-584 (1995).

Dynamic vulcanization may be effected by mixing the rubber, thermoplastic resin, and cure system at elevated temperatures in conventional mixing equipment. In one embodiment, where the thermoplastic vulcanizates are produced under low shear, the mixing equipment may include a Banbury mixer, Brabender mixer, Farrell continuous mixer, or the like. In another embodiment, the thermoplastic vulcanizates are produced under high shear such as described in U.S. Pat. No. 4,594,390, which is incorporated herein by reference. High shear dynamic vulcanization can take place within extruders with kneaders or mixing elements having one or more mixing tips or flights, extruders with one or more screws, co-rotating or counter rotating extruders or Buss kneaders. The various equipment that can be employed includes those described in "Mixing Practices Incorporating Twin-Screw Extruders," by Andersen, and "Intermeshing Twin-Screw Extruders" by Sakai, Chapters 20 and 21, MIXING AND COMPOUNDING OF POLYMERS: THEORY AND PRACTICE by Ica Manas-Zloczower and Zebev Tadmor, New York: Hanser, (1994), which is incorporated herein by reference.

Useful rubbers include elastomeric copolymers that include polymeric units deriving from vinyl norbornene. As is known in the art, elastomeric copolymers also preferably include units deriving from ethylene and one or more α-olefins. Useful elastomeric copolymers may also include units deriving from other diene monomer in addition to vinyl norbornene. In one embodiment, the elastomeric copolymers include a terpolymer having units deriving from ethylene, one or more α-olefins, and one or more diene monomers including 5-vinyl-2-norbornene. These ethylene, α-olefin, diene terpolymers may be referred to as VNB EADMs. The α-olefins may include, but are not limited to, propylene, 1-butene, 1-hexene, 4-methyl-1-pentene, 1-octene, 1-decene, or combinations thereof. Other diene monomers that may be used in combination with the 5-vinyl-2-norbornene include 5-ethylidene-2-norbornene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; and dicyclopentadiene.

In one embodiment, the VNB EADMs include greater than 5 mole %, optionally greater than 40 mole %, optionally greater than 45 mole %, and optionally greater than 50 mole % ethylene units deriving from ethylene monomer; on the other hand, these VNB EADMs include less than 75 mole %, optionally less than 65 mole %, optionally less than 60 mole %, and optionally less than 58 mole % ethylene units deriving from ethylene monomer. With respect to the diene units, in one or more embodiments, the VNB EADMs include greater than about 0.1 mole %, optionally greater than 0.5 mole %, optionally greater than 1 mole %, optionally greater than 2 mole % diene units deriving from 5-vinyl-2-norbornene monomer; on the other hand, these VNB EADMs include less than 15 mole %, optionally less than 10 mole %, optionally less than 5 mole %, and optionally less than 3 mole % diene units deriving from 5-vinyl-2-norbornene monomer. The balance of the terpolymer includes α-olefin units deriving from α-olefin monomer (e.g., propylene). In other embodiments, the amount of diene present in the terpolymer may be expressed in weight percent. For example, the terpolymer may include from about 0.1 to about 5 weight percent, more preferably from about 0.2 to about 4 weight percent, and even more preferably from about 0.5 to about 3.0 weight percent diene units deriving from 5-vinyl-2-norbornene monomer. In the event that the VNB EADM includes other diene units, the overall diene content of the elastomeric copolymer will generally fall within the ranges provided above with respect to the vinyl norbornene monomer and the overall diene content preferably includes greater than 30%, more preferably greater than 40%, more preferably greater than 50%, and even more preferably greater than 60% units deriving from vinyl norbornene where the percentage is based upon the total diene content.

In one embodiment, useful VNB EADMs include those described in U.S. Pat. No. 5,656,693, which is incorporated herein by reference. These terpolymers preferably include from about 40 to about 90 mole percent of its polymeric units deriving from ethylene, and from about 0.2 to about 5 mole percent of its polymeric units deriving from vinyl norbornene, based on the total moles of the terpolymer, with the balance comprising units deriving from α-olefin monomer. Other useful olefinic elastomeric copolymers are disclosed in U.S. Pat. Nos. 6,268,438, 6,288,171, and 6,245,856, and International. Publication No. WO 2004/000900, which are incorporated herein by reference, with the understanding that one or more diene units derive from 5-vinyl-2-norbornene.

The preferred VNB EADMs are characterized by a weight average molecular weight ($M_w$) that is preferably greater than 50,000, more preferably greater than 100,000, even more preferably greater than 200,000, and still more preferably greater than 300,000; and the weight average molecular weight of the preferred VNB EADMs is preferably less than 1,200,000, more preferably less than 1,000,000, still more preferably less than 900,000, and even more preferably less than 800,000. In one embodiment, The preferred VNB EADMs have a number average molecular weight ($M_n$) that is preferably greater than 20,000, more preferably greater than 60,000, even more preferably greater than 100,000, and still more preferably greater than 150,000; and the number average molecular weight of the preferred VNB EADMs is preferably less than 500,000, more preferably less than 400,000, still more preferably less than 300,000, and even more preferably less than 250,000.

The preferred VNB EADMs may also be characterized by having a Mooney viscosity ($ML_{(1+4)}$ at 125° C.) per ASTM D 1646, that is greater than about 50, optionally greater than about 75, optionally greater than about 90, and optionally in the range of 100 to about 500. Where higher Mooney viscosities exist, which may be useful in the practice of this invention, measurements may be made at higher temperatures or by using known "small rotor" techniques; these methods are described in WO 2004/000900 which is incorporated by reference for purpose of U.S. practice. Where higher molecular weight olefinic elastomeric copolymers are employed within the thermoplastic vulcanizates of this invention, these high molecular weight polymers may be obtained in an oil-extended form. These oil-extended copolymers typically include from about 15 to about 100 parts by weight, per 100 parts by weight rubber, of a paraffinic oil. The Mooney viscosity of these oil-extended copolymers is from about 45 to about 80 and preferably from about 50 to about 70.

Useful VNB EADMs may be manufactured or synthesized by using a variety of techniques. For example, useful techniques are disclosed in U.S. Pat. No. 5,656,693, WO 2004/000900 A1, JP 151758, and JP 210169, which are incorporated herein by reference for purposes of U.S practice. As those skilled in the art will appreciate, useful synthetic techniques may include solution, slurry, or gas phase polymerization techniques that employ numerous catalyst systems such as Ziegler-Natta systems and single-site catalyst systems.

In one or more embodiments, the thermoplastic resins include solid, generally high molecular weight plastic materials. Exemplary thermoplastic resins include crystalline and crystallizable polyolefins, polyimides, polyesters (nylons), and fluorine-containing thermoplastics. Also, the thermoplastic resins may include copolymers of polyolefins with styrene such as styrene-ethylene copolymer. The preferred thermoplastic resins are crystallizable polyolefins that are formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene or ethylene or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. Specifically included are the reactor, impact, and random copolymers of propylene with ethylene or the higher α-olefins, described above, or with $C_{10}$-$C_{20}$ diolefins. Comonomer contents for these propylene copolymers will typically be from 1 to about 30% by weight of the polymer, for example, See U.S. Pat. Nos. 6,268,438, 6,288,171, and 6,245,856. Blends or mixtures of 2 or more polyolefin thermoplastics such as described herein, or with other polymeric modifiers, are also suitable in accordance with this invention. These homopolymers and copolymers may be synthesized by using an appropriate polymerization technique known in the art such as, but not limited to, the conventional Ziegler-Natta type polymerizations, and catalysis employing single-site organometallic catalysts including, but not limited to, metallocene catalysts. Useful thermoplastic resins are available under the tradenames PP7032™, PP1043™, PP1052™, PP1183™, and PP1042™ (ExxonMobil), ACHIEVE™ 3854, 3825, and 3904 (ExxonMobil), 51SO7A™ (Lyondell), D008M™ (Aristech), and Vistamaxx Polypropylene Copolymers™ (ExxonMobil).

These thermoplastic resins preferably have a weight average molecular weight from about 200,000 to about 2,000,000, and a number average molecular weight from about 80,000 to about 800,000. More preferably, these resins have a weight average molecular weight from about 300,000 to about 600,000, and a number average molecular weight from about 90,000 to about 150,000.

Preferably, the linear thermoplastic resins have a melt flow rate that is less than about 10 dg/min, preferably less than about 2 dg/min, still more preferably less than about 1.0 dg/min, and even more preferably less than about 0.5 dg/min.

These thermoplastic resins also preferably have a melt temperature ($T_m$) that is from about 150 to about 175° C., more preferably from about 155 to about 170° C., and even more preferably from about 160 to about 170° C. The glass transition temperature ($T_g$) of these resins is preferably from about −5 to about 10° C., more preferably from about −3 to about 5° C., and even more preferably from about 0 to about 2° C. The crystallization temperature ($T_c$) of these resins is preferably at least about 75° C., more preferably at least about 95° C., even more preferably at least about 100° C., and still more preferably at least 105° C., with the preferred crystallization temperature ranging from 105° to 110° C.

Also, these thermoplastic resins are preferably characterized by having a heat of fusion of at least 50 J/g, preferably in excess of 75 J/g, more preferably in excess of 100 J/g, and even more preferably in excess of 120 J/g.

An especially preferred thermoplastic resin is a high-crystallinity isotactic or syndiotactic polypropylene. This polypropylene generally has a density of from about 0.85 to about 0.91 g/cc, with the largely isotactic polypropylene having a density of from about 0.90 to about 0.91 g/cc, and a number average molecular weight of about 120,000 and a weight average molecular weight of about 590,000. Also, high and ultra-high molecular weight polypropylene that has a fractional melt flow rate are included. These polypropylene resins are characterized by a melt flow rate that is less than or equal to 10 dg/min, more preferably less than or equal to 1.0 dg/min, and even more preferably less than or equal to 0.5 dg/min per ASTM D-1238.

Peroxide curatives are generally selected from organic peroxides. Examples of organic peroxides include, but are not limited to, di-tert-butyl peroxide, dicumyl peroxide, t-butylcumyl peroxide, α,α-bis(tert-butylperoxy) diisopropyl benzene, 2,5-dimethyl-2,5-di(t-butylperoxy)hexane (MPH), 1,1-di(tert-butylperoxy)-3,3,5-trimethyl cyclohexane, n-butyl-4-4-bis(tert-butylperoxy) valerate, benzoyl peroxide, lauroyl peroxide, dilauroyl peroxide, 2,5-dimethyl-2,5-di(tert-butylperoxy) hexyne-3, and mixtures thereof. Also, diaryl peroxides, ketone peroxides, peroxydicarbonates, peroxyesters, dialkyl peroxides, hydroperoxides, peroxyketals and mixtures thereof may be used.

The peroxide curatives are preferably employed in conjunction with one or more coagent. Examples of coagents include triallylcyanurate, triallyl isocyanurate, triallyl phosphate, sulfur, N-phenyl bis-maleamide, zinc diacrylate, zinc dimethacrylate, divinyl benzene, 1,2 polybutadiene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, oximer for e.g., quinone dioxime, and mixtures thereof. In order to maximize the efficiency of peroxide/coagent crosslinking the mixing and dynamic vulcanization are preferably carried out in a nitrogen atmosphere. Useful peroxides and their methods of use in dynamic vulcanization of thermoplastic vulcanizates are disclosed in U.S. Pat. No. 5,656,693, which is incorporated herein by reference.

Plasticizers, extender oils, synthetic processing oils, or a combination thereof may also be added to the blend in the first stage. The extender oils may include, but are not limited to, aromatic, naphthenic, and paraffinic extender oils. Exemplary synthetic processing oils are polylinear α-olefins, polybranched α-olefins, and hydrogenated polyalphaolefins. The compositions of this invention may include organic esters, alkyl ethers, or combinations thereof. U.S. Pat. Nos. 5,290,886 and 5,397,832 are incorporated herein in this regard. The addition of certain low to medium molecular weight organic esters and alkyl ether esters to the compositions of the invention dramatically lowers the $T_g$ of the polyolefin and rubber components, and of the overall composition, and improves the low temperatures properties, particularly flexibility and strength. These organic esters and alkyl ether esters generally have a molecular weight that is generally less than about 10,000. It is believed that the improved effects are achieved by the partitioning of the ester into both the polyolefin and rubber components of the compositions. Particularly suitable esters include monomeric and oligomeric materials having an average molecular weight below about 2000, and preferably below about 600. The ester should be compatible, or miscible, with both the polyolefin and rubber components of the composition; i.e. that it mix with the other components to form a single phase. The esters found to be most suitable were either aliphatic mono- or diesters or alternatively oligomeric aliphatic esters or alkyl ether esters. Polymeric aliphatic esters and aromatic esters were found to be significantly less effective, and phosphate esters were for the most part ineffective. Synthetic polyalphaolefins are also useful in lowering Tg.

In certain embodiments of this invention, a polymeric processing additive may be added in the first stage. The processing additive may be a polymeric resin that has a very high melt flow index. These polymeric resins include both linear and branched molecules that have a melt flow rate that is greater than about 500 dg/min, more preferably greater than about 750 dg/min, even more preferably greater than about 1000 dg/min, still more preferably greater than about 1200 dg/min, and still more preferably greater than about 1500 dg/min. The thermoplastic elastomers of the present invention may include mixtures of various branched or various linear polymeric processing additives, as well as mixtures of both linear and branched polymeric processing additives. Reference to polymeric processing additives will include both linear and branched additives unless otherwise specified. The preferred linear polymeric processing additives are polypropylene homopolymers. The preferred branched polymeric processing additives include diene-modified polypropylene polymers. Thermoplastic vulcanizates that include similar processing additives are disclosed in U.S. Pat. No. 6,451,915, which is incorporated herein by reference.

The ingredients within the blend of the first stage may also include reinforcing and non-reinforcing fillers, antioxidants, stabilizers, rubber processing oil, lubricants, antiblocking agents, anti-static agents, waxes, foaming agents, pigments, flame retardants and other processing aids known in the rubber compounding art. Fillers and extenders that can be utilized include conventional inorganics such as calcium carbonate, clays, silica, talc, titanium dioxide, carbon black, as well as organic and inorganic nanoscopic fillers. Fillers, such as carbon black, may be added in combination with a carrier such as polypropylene.

The amount of each ingredient added to the blend in the first stage may vary, although as noted above, preferably the volume fraction of the rubber is initially greater than the thermoplastic resin.

While volume fraction of the rubber is preferably greater than the thermoplastic resin (although not required), those skilled in the art appreciate that there is a minimum amount of thermoplastic resin required to achieve and maintain phase inversion in dynamic vulcanization, although this amount may vary based upon mixing intensity, the elasticity ratio, the viscosity ratio, interfacial tension, and the cure state. Because some of the benefits of this invention are achieved by adding additional thermoplastic resin after phase invention is achieved, it is preferred that the dynamic vulcanization of the rubber within the first stage take place in the presence of at least the minimum amount of thermoplastic resin necessary to achieve phase inversion of the blend. Preferably, this amount includes a thermoplastic resin to rubber weight ratio of at least 0.1:1, more preferably at least 0.2:1, even more preferably at least 0.25:1, still more preferably at least 0.3:1, and even more preferably 0.35:1.

While there is no upper limit on the amount of thermoplastic resin that may be present in the first stage, some of the benefits of this invention result from dynamically vulcanizing the rubber in the presence of less thermoplastic resin than would otherwise be used to achieve similar products. In other words, advantages are achieved by the step of adding thermoplastic resin in a second stage. Accordingly, the preferred maximum weight ratio of thermoplastic resin to rubber is less than 2:1, more preferably less than 0.8:1, even more preferably less than 0.6:1, still more preferably less than 0.5:1, more preferably less than 0.45:1, and even more preferably less than 0.4:1.

In one or more embodiments, a vulcanizing amount of curative preferably includes greater than $1\times10^{-5}$ moles, optionally greater than $1\times10^{-4}$, optionally greater than $1\times10^{-3}$, optionally greater than or equal to $0.25\times10^{-2}$, and optionally greater than or equal to $0.5\times10^{-2}$ moles per 100 parts by weight rubber; on the other hand, a vulcanizing amount of curative preferably includes less than $4\times10^{-2}$, optionally less than $3\times10^{-2}$, optionally less than $2\times10^{-2}$, optionally less than or equal to $1.5\times10^{-2}$, and optionally less than or equal to $1\times10^{-2}$ moles per 100 parts by weight rubber. The amount may also be expressed as a weight per 100 parts by weight rubber. This amount, however, may vary depending on the curative employed. For example, where 2,5-dimethyl-2,5 di-(t-butyl peroxy)hexane is employed, the amount employed may include from about 0.5 to about 12, optionally from 0.6 to about 6, and optionally from about 0.75 to about 3.25 parts by weight peroxide per 100 parts by weight rubber based on the weight of the active peroxide without dilution. In other embodiments, a vulcanizing amount of curative includes from about $1\times10^{-4}$ moles to about $4\times10^{-2}$ moles, more preferably from about $2\times10^{-4}$ moles to about $3\times10^{-2}$ moles, and even more preferably from about $7\times10^{-4}$ moles to about $2\times10^{-2}$ moles per 100 parts by weight rubber.

The skilled artisan will be able to readily determine a sufficient or effective amount of coagent without undue calculation or experimentation. In preferred embodiments, the amount of coagent employed is similar in terms of moles to the number of moles of curative employed. The amount of coagent may also be expressed as weight per 100 parts by weight rubber. For example, where the triallylcyanurate coagent is employed, it is preferably employed in an amount from about 0.25 parts by weight to about 30 parts by weight, optionally 0.5 phr to about 10 parts by weight, and optionally 0.75 to 3.25 parts by weight coagent per 100 parts by weight rubber (based on the active coagent without dilution).

When employed as an ingredient in the first stage, the various plasticizers, processing oils, extender oils, or synthetic processing oils may be added in amounts equal to or greater than 50 parts by weight, optionally equal to or greater than 75 parts by weight, optionally greater than or equal to 100 parts by weight, and optionally greater than or equal to 125 parts by weight oil per 100 parts by weight rubber; on the other hand, the amount of oil employed in the first stage may be less than 300 parts by weight, optionally less than 250 parts by weight, and optionally less than 200 parts by weight oil per 100 parts by weight rubber. The quantity of extender oil added depends upon the properties desired, with the upper limit depending upon the compatibility of the particular oil and blend ingredients; this limit is exceeded when excessive exuding of extender oil occurs. The amount of ester plasticizer in the composition will generally be less than about 250 parts, and preferably less than about 175 parts, per 100 parts rubber.

When employed as an ingredient in the first stage, the polymeric processing additives may be added in amounts from about 1 to about 25 parts by weight, preferably from about 1.5 to about 20 parts by weight, and more preferably from about 2 to about 15 parts by weight per 100 parts by weight of the rubber and thermoplastic resin combined.

When included as an ingredient in the first stage, fillers may be added in amount from about 0 to about 250 parts by weight or preferably about 10 to 200 per 100 parts by weight of rubber. The amount of carbon black that can be used depends, at least in part, upon the type of carbon black and the amount of extender oil that is used. The amount of extender oil depends, at least in part, upon the type of rubber. High viscosity rubbers are more highly oil extendable.

Within the second stage, which begins immediately after phase inversion is achieved, additional thermoplastic resin is added to the product of the first stage, i.e., the phase-inverted blend or first-stage thermoplastic vulcanizate. The additional thermoplastic resin is preferably added while it is in the molten state. In other words, the additional thermoplastic resin is added at or above the melt temperature of the thermoplastic resin or, in the case of an amorphous resin, at or above the glass transition temperature of the amorphous resin.

Accordingly, additional thermoplastic resin can be added as soon as phase inversion is achieved, or it can be added later in time, so long as the product of the first stage remains in the melt. Although several factors such as the mixing intensity, the degree of cure, and the ratio of thermoplastic resin to rubber can impact the time at which the inversion occurs, those skilled in the art appreciate that, under conventional conditions, phase inversion of compositions where rubber is the major volume fraction component relative to the thermoplastic component will typically occur once at least about 50% to about 75% of the curative required to achieve a full cure of the rubber is consumed, although as noted above, full cure of the rubber is not required for practicing this invention.

In one embodiment, the additional thermoplastic resin is added after the desired cure is achieved. In other words, the additional thermoplastic resin is not added until the targeted cure level is achieved or the curative added in the first stage is substantially consumed, which generally refers to greater than about 90% consumption of the curative required to achieve full cure of the rubber.

In another embodiment, the additional thermoplastic resin is added in incremental additions. While these incremental additions are made after phase inversion, they can be made before, after, or both before and after full cure or complete or substantial curative consumption is achieved.

The thermoplastic resin that is added in the second stage can include any of the thermoplastic resins employed in the first stage, although the thermoplastic resin employed in each stage need not be the same.

The addition of additional thermoplastic resin advantageously provides the ability to tailor the hardness of the overall thermoplastic vulcanizate. Accordingly, there are no thresholds or limits on the amount of thermoplastic resin that may be added in the second stage. For example, a sufficient amount of thermoplastic resin needed to achieve a composition comprising up to about 400-500 parts by weight thermoplastic resin per 100 parts by weight rubber can be added during the second stage. It is, however, preferred to add from about 10 to about 300, more preferably from about 20 to about 200, and even more preferably from about 30 to about 150 parts by weight thermoplastic resin per 100 parts by weight rubber during the second stage.

In addition to the additional thermoplastic resin, other ingredients can be added in the second stage. These additives can advantageously be added together with or simultaneously with the additional thermoplastic resin. In other words, the molten thermoplastic resin can advantageously act as a carrier for these other ingredients. These ingredients include antioxidants, processing aids, reinforcing and non-reinforcing fillers, pigments, waxes, rubber processing oil, extender oils, antiblocking agents, antistatic agents, ultraviolet stabilizers, plasticizers (including esters), foaming agents, flame retardants, scavengers, neutralization agents, and other additives known in the rubber and compounding art.

This invention advantageously provides the ability to add filler in the first stage as well as in the second stage in a single-pass or one-step process. Therefore, in one embodiment, filler, such as carbon black, can be added in conjunction with the thermoplastic resin in the second stage. It has advantageously been found that the surface properties of the thermoplastic vulcanizate can be tailored by employing this technique.

Because fillers, such as carbon black, may be introduced into the thermoplastic vulcanizate together with the thermoplastic resin during the second stage of the process, the amount of carbon black that may ultimately be added can vary depending upon the concentration of the carbon black within the thermoplastic resin. Advantageously, all of the carbon black present within the final thermoplastic vulcanizate product (e.g., 10-250 phr) can be added via the second stage, although it may be desirable to simply add a fraction of the desired carbon black during the second stage.

As with the filler, the amount of oil added during the second stage can vary greatly depending on the concentration of the oil within the thermoplastic resin. Advantageously, some of the processing oil present in the final thermoplastic vulcanizate product can be added via the second stage, and it may be desirable to simply add a fraction of the desired oil during the second stage.

While the amount of oil added during the second stage can vary, the amount of oil added during the second stage may advantageously vary from about 5 to about 100, and more preferably form about 10 to about 50 parts by weight oil per 100 parts by weight rubber.

The addition of additional thermoplastic resin within the second stage can be achieved by employing a variety of techniques. Within the second stage, effective melt blending of the additional thermoplastic resin is preferably achieved. In one embodiment, the additional ingredients can be added to the blend while the blend remains within the same mixing apparatus that was employed during the first stage. For example, where a single twin-screw extruder is employed in a continuous operation, additional ingredients (e.g., thermoplastic resin) can be added downstream within the same twin screw extruder (e.g., in a downstream barrel). This may be accomplished by employing a secondary apparatus for example, a continuous mixer, single screw or twin screw extruder, ring extruder, or multi-screw extruder.

In another embodiment, a tandem or parallel extruder process can be employed. In this process, two extruders are employed in sequence or parallel; the first extruder is employed as the first-stage reactor where dynamic vulcanization is achieved, and the second extruder is employed as the second-stage reactor where additional molten thermoplastic resin is added to the blend. As with the previous embodiment, the additional thermoplastic resin can be added in the melt phase by using a variety of techniques such as an extruder. Where tandem or parallel extruders are employed, the material from the first reactor remains in the melt at all times and the process is continuous.

The transition of product between the first stage and second stage is continuous and the product of the first stage remains in the molten or melt phase; i.e., the product of the first stage will flow. In other words, the temperature of the product manufactured in the first stage is not allowed to cool below the melting temperature or crystallization temperature of the thermoplastic resin prior to the addition of the additional molten thermoplastic resin. This is true regardless of the number of extruders or mixers that are employed.

The product of the first stage remains in the melt until the second stage is complete, i.e., all of the desired additional thermoplastic resin is added. After completion of the second stage, the product can be cooled and handled using conventional techniques. For example, the product may be pelletized.

Despite the fact that the rubber may be partially or fully cured, the compositions of this invention can be processed and reprocessed by conventional plastic processing techniques such as extrusion, injection molding, blow molding, and compression molding. The rubber within these thermoplastic elastomers is usually in the form of finely-divided and well-dispersed particles of vulcanized or cured rubber within a continuous thermoplastic phase or matrix, although a co-continuous morphology or a phase inversion is also possible. In those embodiments where the cured rubber is in the form of finely-divided and well-dispersed particles within the thermoplastic medium, the rubber particles typically have an average diameter that is less than 50 μm, preferably less than 30 μm, even more preferably less than 10 μm, still more preferably less than 5 μm and even more preferably less than 1 μm. In preferred embodiments, at least 50%, more preferably at least 60%, and even more preferably at least 75% of the particles have an average diameter of less than 5 μm, more preferably less than 2 μm, and even more preferably less than 1 μm.

Preferably, compositions resulting from this multiple-stage continuous process will contain a sufficient amount of the elastomeric copolymer to form rubbery compositions of matter. The skilled artisan will understand that rubbery compositions of matter are those that have ultimate elongations greater than 100 percent, and that quickly retract to 150 percent or less of their original length within about 10 minutes after being stretched to 200 percent of their original length and held at 200 percent of their original length for about 10 minutes.

Accordingly, the resulting thermoplastic elastomers should comprise at least about 25 percent by weight rubber. More specifically, the thermoplastic vulcanizates may include from about 15 to about 90 percent by weight, optionally from about 45 to about 80 percent by weight, and optionally from about 60 to about 80 percent by weight or rubber, based on the total weight of rubber and thermoplastic component combined.

The resulting thermoplastic elastomers may comprise from about 10 to about 80 percent by weight of the thermoplastic resin based on the total weight of the rubber and thermoplastic resin combined. Optionally, the thermoplastic elastomers comprise from about 20 to about 70 percent by weight, optionally from about 25 to a bout 40 percent by weight, and optionally from about 30 to about 35 percent by weight of the thermoplastic resin based on the total weight of the rubber and thermoplastic resin combined.

Advantageously, the thermoplastic vulcanizates produced according to this invention can be manufactured to be relatively hard and yet the process for producing them only employs that amount of curative or less than would conventionally be required to produce relatively soft products. For example, thermoplastic vulcanizates having a hardness of at least 55 Shore A, optionally at least 60 Shore A, optionally at least 65 Shore A, optionally at least 70 Shore A, optionally at least 75 Shore A, and optionally at least 40 Shore D can be produced by using that level of curative that would have conventionally been employed to produce thermoplastic vulcanizates that have a hardness of no more than 55 Shore A, optionally no more than 50 Shore A, optionally no more than 40 Shore A, and optionally no more than 30 Shore A.

The thermoplastic elastomers produced according to this invention are useful for making a variety of articles such as weather seals, hoses, belts, gaskets, moldings, boots, elastic fibers, roofing sheets, foamed products, and like articles. They are particularly useful for making articles by blow molding, extrusion, injection molding, thermo-forming, calendaring, elasto-welding and compression molding techniques. More specifically, they are useful for making vehicle parts such as weather seals, brake parts such as cups, coupling disks, and diaphragm cups, boots such as for constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal/plastic combination materials. Also contemplated are transmission belts including V-belts, toothed belts with truncated ribs containing fabric faced V's, ground short fiber reinforced V's or molded gum with short fiber flocked V's.

In order to demonstrate the practice of the present invention, the following examples have been prepared and tested. The examples should not, however, be viewed as limiting the scope of the invention. The claims will serve to define the invention.

EXAMPLES

Samples 1-12

Twelve thermoplastic vulcanizates were prepared by dynamically vulcanizing an elastomeric copolymer with a peroxide cure system. Specifically, a two-stage continuous process was employed wherein additional polypropylene was added in the second stage. The amount of polypropylene added in the second stage (i.e., down-stream feed) is set forth in Table II. The polypropylene introduced in the first stage (i.e., initial feed) is likewise set forth in Table II.

The following ingredients were used in each sample, which was manufactured by using the procedures generally set forth in U.S. Pat. No. 4,594,390. Samples 1-3 employed poly(ethylene-co-propylene-co-ethylene norbornene) as the elastomeric copolymer (Vistalon™ 3666), which included 75 parts by weight oil in addition to the rubber, and Samples 4-12 employed various poly(ethylene-co-propylene-co-vinyl norbornene) terpolymers, which included 100 parts by weight oil in addition to the rubber. The terpolymer including units deriving from vinyl norbornene were prepared in accordance with U.S. Pat. No. 5,656,693. The specific properties of each elastomeric copolymer are set forth in Table I. Table II sets forth the level of curative employed and the properties of each sample.

The ingredients included 100 parts by weight of elastomeric copolymer, propylene as set forth in Table II, 131.65 parts by weight oil (total oil including that amount added with the rubber product), 42 parts by weight clay, 3.4 parts by weight wax, 1.94 parts by weight zinc oxide, 24.4 parts by weight of a carbon black-polypropylene package, 2.0 parts by weight antioxidant (Irganox 1010), 6.5 parts by weight peroxide, and 6 parts by weight coagent, each based on 100 hundred parts by weight elastomeric copolymer. The peroxide was a 50% active 2,5-dimethyl-2,5di-(t-butyl peroxy) hexane in oil or inert filler, the coagent was a 50% active triallylcyanurate in inert filler, and the carbon black package included 60% by weight polypropylene and 40% by weight carbon black. The polypropylene was characterized by having a melt flow rate of 0.7 dg/min (51SO7A Lyondell). Also provided in Table II are the results of various tests that were conducted on the samples. The amounts provided in Tables are provided in parts by weight (phr) per 100 parts by weight rubber (phr) unless otherwise specified.

Even though ingredients were added as part of an initial and downstream feed, the overall blend remained within a melt (i.e., without changing phase) between each ingredient feed (i.e., the first and second stages).

TABLE I

|  | Diene (wt. %) | Mooney $ML_{(1+4)}$@125° C. | Oil (phr) | $C_2$ (wt %) |
|---|---|---|---|---|
| Poly(ethylene-co-propylene-co-ethylene norbornene) | 4.1 | 50 | 75 | 64 |
| Poly(ethylene-co-propylene-co-vinyl norbornene) I | 3.0 | 45 | 100 | 63 |
| Poly(ethylene-co-propylene-co-vinyl norbornene) II | 0.7 | 52 | 100 | 63 |
| Poly(ethylene-co-propylene-co-vinyl norbornene) III | 1.5 | 47 | 100 | 63 |

$C_2$ = ethylene

TABLE II

| | Sample | | | | | |
|---|---|---|---|---|---|---|
| | 1 | 2 | 3 | 4 | 5 | 6 |
| Elastomeric Copolymer | | | | | | |
| poly(ethylene-co-propylene-co-ethylene norbornene) | 100 | 100 | 100 | — | — | — |
| poly(ethylene-co-propylene-co-vinyl norbornene) I | — | — | — | 100 | 100 | 100 |
| poly(ethylene-co-propylene-co-vinyl norbornene) II | — | — | — | — | — | — |
| poly(ethylene-co-propylene-co-vinyl norbornene) III | — | — | — | — | — | — |
| Polypropylene I (phr) | | | | | | |
| First stage | 28 | 28 | 28 | 28 | 28 | 28 |
| Second stage | 18 | 18 | 18 | 18 | 18 | 18 |
| Peroxide | 6.5 | 3.2 | 1.5 | 6.5 | 3.2 | 1.5 |
| Coagent | 6 | 3 | 1.5 | 6 | 3 | 1.5 |
| Properties | | | | | | |
| Hardness (Shore A) | 68 | 66 | 65 | 67 | 68 | 68 |
| Specific Gravity | 0.997 | 0.961 | 0.971 | 0.968 | 0.975 | 0.971 |
| Ultimate Tensile Strength (MPa) | 5.33 | 4.15 | 3.03 | 6.80 | 7.52 | 6.41 |
| Ultimate Elongation (%) | 331 | 505 | 477 | 323 | 452 | 492 |

TABLE II-continued

| | | | | | | |
|---|---|---|---|---|---|---|
| 100% Modulus (MPa) | 2.83 | 2.14 | 2.02 | 2.92 | 2.77 | 2.52 |
| Weight Gain (%), 24 h @ 121° C. | 91 | 147 | 202 | 84 | 93 | 112 |
| LCR Viscosity @ 1200 s$^{-1}$ | 66 | 58 | 60 | 76 | 73 | 76 |
| ESR | 109 | 36 | 30 | 96 | 82 | 111 |
| Tension Set (%) | 13.5 | 18 | 30 | 10.5 | 14.5 | 18.5 |
| Room Temperature Cyclohexane Extractables, % | 2.58, 2.61 | 10.07, 10.26 | 26.06, 25.69 | 1.76, 1.77 | 4.13, 4.18 | 7.32, 7.09 |
| Boiling xylene Extractables, % | 3.85, 5.80 | 15.43, 15.40 | 35.70, 32.94 | 3.31, 2.97 | 5.50, 3.71 | 8.86, 8.81 |
| Compression Set 22 h @ 100° C. (%) | 33 | 53 | 76 | 26 | 34 | 44 |
| Compression Set 168 h @ 100° C. (%) | 40 | 64 | 80 | 32 | 41 | 52 |

| | Sample | | | | | |
|---|---|---|---|---|---|---|
| | 7 | 8 | 9 | 10 | 11 | 12 |
| Elastomeric Copolymer | | | | | | |
| poly(ethylene-co-propylene-co-ethylene norbornene) | | | | | | |
| poly(ethylene-co-propylene-co-vinyl norbornene) I | — | — | — | — | — | — |
| poly(ethylene-co-propylene-co-vinyl norbornene) II | 100 | 100 | 100 | — | — | — |
| poly(ethylene-co-propylene-co-vinyl norbornene) III | — | — | — | 100 | 100 | 100 |
| Polypropylene I (phr) | | | | | | |
| First stage | 28 | 28 | 28 | 28 | 28 | 28 |
| Second stage | 18 | 18 | 18 | 18 | 18 | 18 |
| Peroxide | 6.5 | 3.2 | 1.5 | 6.5 | 3.2 | 1.5 |
| Coagent | 6 | 3 | 1.5 | 6 | 3 | 1.5 |
| Properties | | | | | | |
| Hardness (Shore A) | 68 | 69 | 68 | 64 | 65 | 65 |
| Specific Gravity | | | | | | |
| Ultimate Tensile Strength (MPa) | 6.12 | 6.03 | 4.51 | 5.83 | 5.77 | 4.82 |
| Ultimate Elongation (%) | 323 | 456 | 471 | 321 | 373 | 438 |
| 100% Modulus (MPa) | 2.76 | 2.56 | 2.28 | 2.62 | 2.52 | 2.20 |
| Weight Gain (%), 24 h @ 121° C. | 93 | 119 | 153 | 93 | 109 | 140 |
| LCR Viscosity @ 1200 s$^{-1}$ | 78 | 73 | 68 | 81 | 76 | 72 |
| ESR | 77 | 68 | 52 | 97 | 114 | 130 |
| Tension Set (%) | 12.5 | 17 | 23 | 10 | 12.5 | 20 |
| Room Temperature Cyclohexane Extractables, % | 2.59, 2.60 | 6.91, 7.05 | 13.5, 13.25 | 3.23, −3.15 | 7.40, 7.44 | 13.78, 13.55 |
| Boiling xylene Extractables, % | 4.94, −4.21 | 10.71, 10.83 | 21.6, 18.72 | 4.81, 4.11 | 9.70, 11.25 | 16.46, 16.96 |
| Compression Set 22 h @ 100° C. (%) | 31 | 46 | 59 | 27 | 41 | 53 |
| Compression Set 168 h @ 100° C. (%) | 35 | 53 | 72 | 34 | 50 | 67 |

Shore hardness was determined according to ASTM D-2240. Ultimate tensile strength, and ultimate elongation and 100% modulus were determined according to ASTM D-412 at 23° C. by using an Instron testing machine. Weight gain was determined according to ASTM D-471 after 24 hours at 125° C. Tension set was determined according to ASTM D-142, compression set was determined at 25% compression according to ASTM D-395, and toughness was determined according to ASTM D-1292.

Extrusion surface roughness (ESR) was measured as described in *Chemical Surface Treatments of Natural Rubber And EPDM Thermoplastic Elastomers: Effects on Friction and Adhesion*, RUBBER CHEMISTRY AND TECHNOLOGY, Vol. 67, No. 4 (1994). LCR Viscosity is measured with a Dynisco™ Capillary rheometer at 30:1 L/D (length/diameter) at 12000 at 204° C.

Various modifications and alterations that do not depart from the scope and spirit of this invention will become apparent to those skilled in the art. This invention is not to be duly limited to the illustrative embodiments set forth herein.

What is claimed is:

1. A process for producing a thermoplastic vulcanizate, the process comprising:
   (i) dynamically vulcanizing a rubber with a curative in a first stage, where the rubber is within a blend that includes the rubber, a propylene homopolymer, oil and the curative, where said step of dynamically vulcanizing occurs at a temperature at or above the melting point of the propylene homopolymer, where said rubber is a terpolymer having units derived from ethylene, one or more α-olefins, and 0.1 to 3.0 mole % polymeric units deriving from 5-vinyl-2-norbornene, wherein said propylene homopolymer has an MFR of less than 1 g/10 min, where said curative is a peroxide curative present in the first stage in an amount of from 0.5 to 6 parts by weight per 100 parts by weight of the rubber, and where the weight ratio of the propylene homopolymer to the rubber is from 0.1:1 to 0.4:1, and where the oil is present in the first stage in an amount of from 50 to 200 parts by weight per 100 parts by weight of the rubber;
   (ii) continuing said step of dynamically vulcanizing to cause phase inversion of the blend to thereby convert the propylene homopolymer into a continuous phase;
   (iii) maintaining the blend at or above the melting point of the propylene homopolymer after the phase inversion; and
   (iv) introducing molten thermoplastic resin into the blend in a second stage, where the thermoplastic resin introduced into the blend in the second stage is a propylene homopolymer, propylene copolymer with ethylene, reactor propylene copolymer, or impact propylene copolymer, where said step of introducing molten thermoplastic resin occurs after phase inversion but before the blend is cooled to a temperature below the melting point of the propylene homopolymer;
   wherein the thermoplastic vulcanizate has the following properties (a)-(d):

(a) Ultimate tensile strength of 5.77 to 7.52 MPa, as determined in accordance with ASTM D-412 at 23° C. using an Instron testing machine;
(b) Compression set of 26% to 31%, as determined at 25% compression, 22 hours, and 100° C. according to ASTM D-395;
(c) Compression set of 32% to 35%, as determined at 25% compression, 168 hours, and 100° C. according to ASTM D-395; and
(d) Tension set of 10 to 12.5%, as determined according to ASTM D-142;
and further wherein the thermoplastic vulcanizate comprises 60 to 80 wt % of the rubber, based on the total weight of the rubber, the polypropylene homopolymer from the first stage, and the thermoplastic resin from the second stage, and where the thermoplastic vulcanizate comprises from 30 to 35 wt % of the polypropylene homopolymer from the first stage and the thermoplastic resin from the second stage, based on the total weight of the rubber, the polypropylene homopolymer from the first stage, and the thermoplastic resin from the second stage; provided that the total amount of thermoplastic vulcanizate, polypropylene homopolymer from the first stage, and the thermoplastic resin from the second stage does not exceed 100% based on the total weight of the rubber, the polypropylene homopolymer from the first stage, and the thermoplastic resin from the second stage.

2. The process of claim 1, where the rubber is a terpolymer including polymeric units deriving from ethylene, propylene, and 5-vinyl-2-norbornene.

3. The process of claim 1, where the terpolymer includes from about 5 to about 75 mole % units deriving from ethylene.

4. The process of claim 1, where oil is added during the second stage in an amount of from about 5 to about 100 parts by weight per 100 parts of the rubber.

5. The process of claim 1, wherein the peroxide curative includes 2,5-dimethyl-2,5-di-(t-butyl peroxy)hexane.

6. A molded, extruded, or foamed article prepared with a thermoplastic vulcanizate prepared by the process of claim 1.

7. The process of claim 1, wherein the thermoplastic vulcanizate has a hardness of at least 60 Shore A.

8. The process of claim 1, wherein the first and second stages takes place in a single mixer.

9. The process of claim 1, wherein carbon black filler is added in the first stage, second stage, or both stages of the process.

10. The process of claim 1, wherein the thermoplastic resin introduced in the second stage is a propylene homopolymer having a MFR of less than 1 g/10 min.

11. A process for preparing a thermoplastic vulcanizate, the process comprising:
(i) preparing a blend in a first stage comprising a rubber, a propylene homopolymer and a curative, where the weight ratio of the propylene homopolymer to the rubber is from 0.1:1 to 0.4:1, where said rubber is a terpolymer having units derived from ethylene, and 0.1 to 3.0 wt % polymeric units deriving from 5-vinyl-2-norbornene, and wherein said propylene homopolymer has an MFR of less than 1 g/10 min,
(ii) dynamically vulcanizing the rubber at a temperature above the melting temperature of the propylene homopolymer, where said step of dynamically vulcanizing employs a peroxide curative present in an amount of from 0.5 to 6 parts by weight per 100 parts by weight of the rubber; and
(iii) adding from about 10 to 300 parts molten thermoplastic resin per 100 parts of the rubber to the blend in a second stage, where the thermoplastic resin introduced into the blend in the second stage is a propylene homopolymer, propylene copolymer with ethylene, reactor propylene copolymer, or impact propylene copolymer, where said step of adding additional thermoplastic resin occurs after said step of dynamically vulcanizing causes phase inversion of the blend, and where said step of adding additional thermoplastic resin occurs before the blend is permitted to cool below the melting temperature of the propylene homopolymer;
wherein the thermoplastic vulcanizate has the following properties (a)-(d):
(a) Ultimate tensile strength of 5.77 to 7.52 MPa, as determined in accordance with ASTM D-412 at 23° C. using an Instron testing machine;
(b) Compression set of 26% to 31%, as determined at 25% compression, 22 hours, and 100° C. according to ASTM D-395;
(c) Compression set of 32% to 35%, as determined at 25% compression, 168 hours, and 100° C. according to ASTM D-395; and
(d) Tension set of 10 to 12.5%, as determined according to ASTM D-142;
and further wherein the thermoplastic vulcanizate comprises 60 to 80 wt % of the rubber, based on the total weight of the rubber, the polypropylene homopolymer from the first stage, and the thermoplastic resin from the second stage, and where the thermoplastic vulcanizate comprises from 30 to 35 wt % of the polypropylene homopolymer from the first stage and the thermoplastic resin from the second stage, based on the total weight of the rubber, the polypropylene homopolymer from the first stage, and the thermoplastic resin from the second stage; provided that the total amount of thermoplastic vulcanizate, polypropylene homopolymer from the first stage, and the thermoplastic resin from the second stage does not exceed 100% based on the total weight of the rubber, the polypropylene homopolymer from the first stage, and the thermoplastic resin from the second stage.

12. The process of claim 11, where the process includes introducing a processing oil during the first stage in an amount of from about 50 to about 300 parts by weight oil per 100 parts by weight of the rubber.

13. The process of claim 11, wherein the thermoplastic vulcanizate has a hardness of at least 60 Shore A.

14. The process of claim 11, wherein the first and second stages takes place in a single mixer.

15. The process of claim 11, wherein carbon black filler is added in the first stage, second stage, or both stages of the process.

16. The process of claim 11, wherein the thermoplastic resin added in the second stage is a propylene homopolymer having a MFR of less than 1 g/10 min.

* * * * *